US011862065B2

(12) United States Patent
Li et al.

(10) Patent No.: US 11,862,065 B2
(45) Date of Patent: Jan. 2, 2024

(54) TIMING CONTROL DEVICE AND CONTROL METHOD THEREOF

(71) Applicant: Novatek Microelectronics Corp., Hsinchu (TW)

(72) Inventors: Grace Li, Taipei (TW); Jen-Ta Yang, Hsinchu County (TW); Yen-Tao Liao, Hsinchu (TW); Yu-Hung Su, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/692,190

(22) Filed: Mar. 11, 2022

(65) Prior Publication Data

US 2022/0293028 A1 Sep. 15, 2022

Related U.S. Application Data

(60) Provisional application No. 63/159,980, filed on Mar. 11, 2021.

(51) Int. Cl.
*G09G 3/20* (2006.01)

(52) U.S. Cl.
CPC ....... *G09G 3/2096* (2013.01); *G09G 2310/08* (2013.01); *G09G 2340/0435* (2013.01)

(58) Field of Classification Search
CPC ........... G09G 2340/0435; G09G 3/2092-2096
See application file for complete search history.

(56) References Cited

U.S. PATENT DOCUMENTS

| | | | | |
|---|---|---|---|---|
| 9,182,805 B2 * | 11/2015 | Kim | ..................... | G09G 3/3685 |
| 10,134,340 B2 * | 11/2018 | Cho | ..................... | G09G 3/3275 |
| 10,559,248 B2 * | 2/2020 | Tsuchi | ................. | G09G 3/2022 |
| 10,902,793 B2 * | 1/2021 | Oh | ....................... | G09G 3/3266 |
| 10,923,012 B1 * | 2/2021 | Hu | ....................... | G09G 3/3677 |
| 11,114,004 B2 * | 9/2021 | Li | ............................ | G09G 3/20 |
| 11,222,614 B1 * | 1/2022 | Yang | ..................... | G06F 1/1677 |
| 11,423,834 B2 * | 8/2022 | Park | ..................... | G09G 3/2096 |
| 2010/0295765 A1 * | 11/2010 | Hsiao | ................... | G09G 3/3648 345/98 |
| 2017/0345375 A1 * | 11/2017 | Cho | ......................... | G09G 5/18 |
| 2018/0330655 A1 * | 11/2018 | Tsuchi | ................. | G09G 3/3688 |
| 2020/0082768 A1 * | 3/2020 | Oh | ....................... | G09G 3/3291 |

(Continued)

FOREIGN PATENT DOCUMENTS

TW 202011380 3/2020

OTHER PUBLICATIONS

"Office Action of Taiwan Counterpart Application", dated Jan. 31, 2023, p. 1-p. 8.

*Primary Examiner* — Patrick F Marinelli
(74) *Attorney, Agent, or Firm* — JCIPRNET

(57) ABSTRACT

A timing control device for the display panel includes a control circuit. The control circuit is configured to generate a plurality of gate scanning control signals and a data transmission control signal. In response to that a display refresh rate changes from a first frequency to a second frequency, the control circuit adjusts the plurality of gate scanning control signals to generate a plurality of adjusted gate scanning control signals, or adjusts the data transmission control signal to generate an adjusted data transmission control signal, for driving a display panel under the second frequency as the display refresh rate.

18 Claims, 7 Drawing Sheets

(56) References Cited

U.S. PATENT DOCUMENTS

| | | | | |
|---|---|---|---|---|
| 2020/0090619 | A1 | 3/2020 | Wang et al. | |
| 2021/0225227 | A1* | 7/2021 | Li | G09G 3/20 |
| 2021/0407436 | A1* | 12/2021 | Park | G09G 3/3233 |
| 2022/0157263 | A1* | 5/2022 | Moon | G09G 3/3266 |
| 2022/0231829 | A1* | 7/2022 | Park | H04L 7/04 |
| 2022/0293028 | A1* | 9/2022 | Li | G09G 3/2096 |

* cited by examiner

TIMING CONTROL DEVICE AND CONTROL METHOD THEREOF

CROSS-REFERENCE TO RELATED APPLICATION

This application claims the priority benefit of U.S. provisional application Ser. No. 63/159,980, filed on Mar. 11, 2021. The entirety of the above-mentioned patent application is hereby incorporated by reference herein and made a part of this specification.

BACKGROUND

Field of the Invention

The invention relates to a timing control device and a control method thereof, and more particularly, to the timing control device for adjusting a data charging time when a display refresh rate is varied.

Description of Related Art

In a display panel, a gate driver can provide a plurality of gate driving signals to sequential turned on a plurality of switches of a plurality of display lines. A source driver can provide transmission data though the switches to be written into pixels of each of the display lines. After the transmission data been charged into the pixel, the switch of the pixel will be cut-off. In conventional art, the switch is implemented by a thin-film transistor (TFT). When the thin-film transistor is in a cut-off mode, there is a leakage current between a drain and a source of the TFT. When the display panel is operated in a variable refresh rate application, the displayed brightness of the display panel will be varied according to the display refresh rate. For instance, a displayed brightness of the display panel will reduce when the display refresh rate of the display panel is lowered. Hence, a performance of the display panel is reduced.

SUMMARY

The invention provides a timing control device and a control method thereof for providing a balanced luminance of a display panel in a variable refresh rate (VRR) application.

According to an embodiment of the invention, the timing control device for the display panel includes a control circuit. The control circuit is configured to generate a plurality of gate scanning control signals and a data transmission control signal. In response to that a display refresh rate changes from a first frequency to a second frequency, the control circuit adjusts the plurality of gate scanning control signals to generate a plurality of adjusted gate scanning control signals, or adjusts the data transmission control signal to generate an adjusted data transmission control signal, for driving a display panel under the second frequency as the display refresh rate.

According to an embodiment of the invention, the control method includes: generating a plurality of gate scanning control signals and a data transmission signal; and, in response to that a display refresh rate changes from a first frequency to a second frequency, adjusting the plurality of gate scanning control signals to generate a plurality of adjusted gate scanning control signals, or adjusting the data transmission control signal to generate an adjusted data transmission control signal, for driving a display panel under the second frequency as the display refresh rate.

To sum up, the control circuit of the timing control device adjusts the gate scanning control signals or the data transmission control signal when the display refresh rate is changed from the first frequency to the second frequency. In the variable refresh rate (VRR) application, the control circuit adjusts a data charging time for the display panel when the display refresh rate is changed, a luminance of the display panel can be balanced, and display quality of the display panel can be improved.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
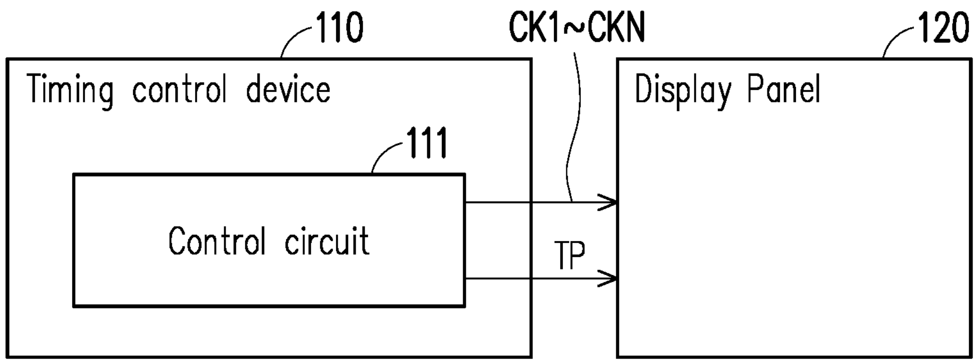
FIG. 1 illustrates a block diagram of a timing control device according to an embodiment of present disclosure.

The term "couple (or connect)" throughout the specification (including the claims) of this application are used broadly and encompass direct and indirect connection or coupling means. For instance, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Figure 2:
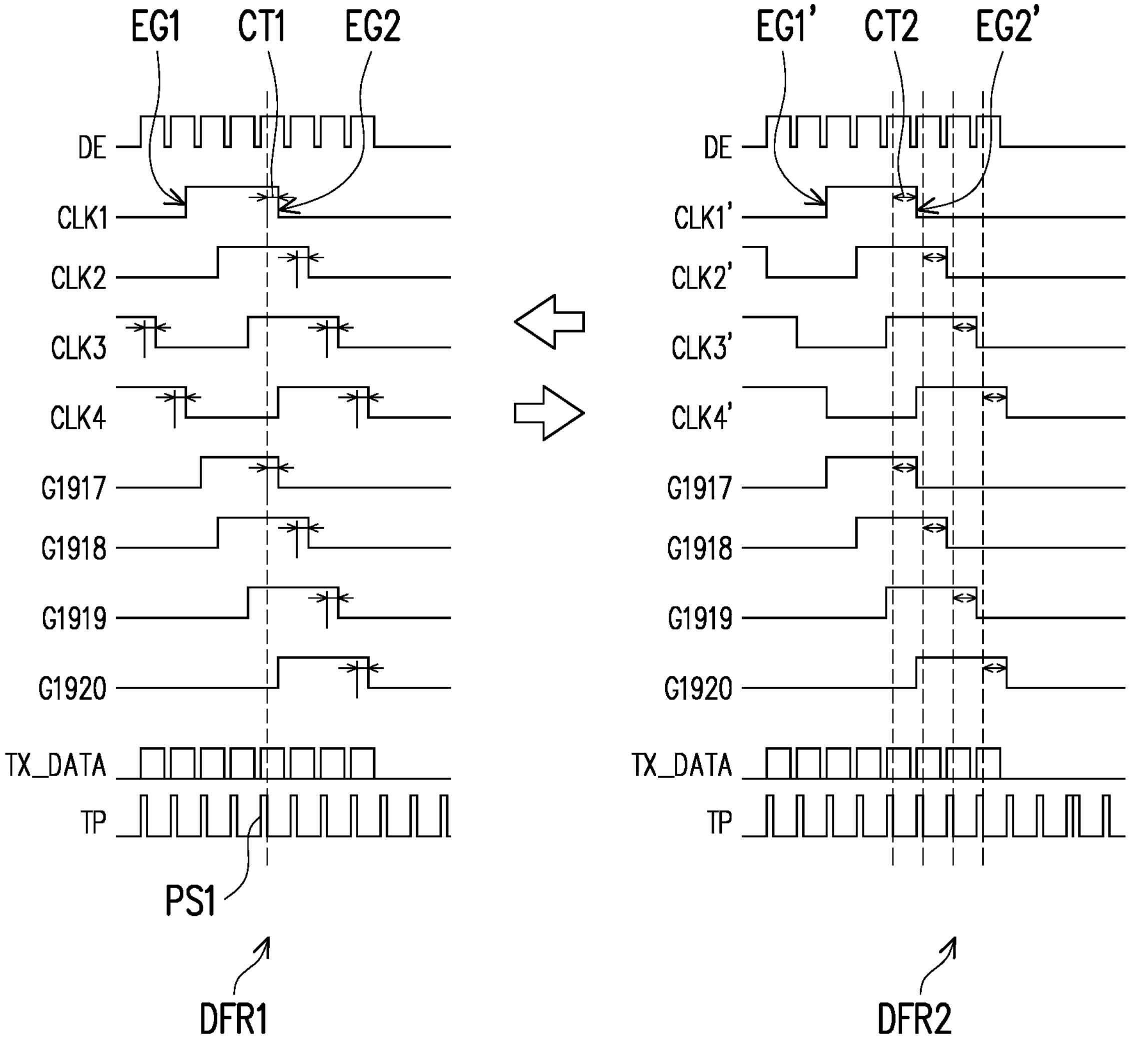
FIG. 2 illustrates waveform plots of a timing control device operated in different display refresh rates according to an embodiment of present disclosure.

Please refer to FIG. 1, which illustrates a block diagram of a timing control device, and also refer to FIG. 2, which illustrates waveform plots of a timing control device operated in different display refresh rates, according to an embodiment of present disclosure. The timing control device 110 includes to a control circuit 111. The control circuit 111 is coupled to a display panel 120. The control circuit 111 is configured to generate a plurality of gate scanning control signals CLK1~CLKN and a data transmission control signal TP, and transports the gate scanning control signals CLK1~CLKN and the data transmission control signal TP to the display panel 120 for driving the display panel 120. In detail, the display panel 120 receives the gate scanning control signals CLK1~CLKN and generates a plurality of gate driving signals, such as gate driving signals G1 to G1920 if the display panel 120 has 1920 gate lines and 1920 display lines (i.e., a pixel row, also called a horizontal line), wherein the gate driving signals G1917 to G1920 are depicted in FIG. 2 as an example. The gate scanning control signals CLK1~CLKN are periodical signals having the same period and different phases, and a gate on array circuit in the display panel 120 may generate the gate driving signals G1 to G1920 respectively output to the gate lines of the display panel 120 according to the gate scanning control signals CLK1~CLK4. In every frame period, each gate driving signal has only one enable period (or called pulse), and the time position of the enable period of each gate driving signal is the same as one of a plurality of pulses of the gate scanning control signals CLK1~CLK4. The timing control device 110 may be as a timing controller integrated circuit (IC), or, the timing control device 110 and a data driving circuit may be implemented as a single-chip display driver IC.

The data transmission control signal TP is a periodical signal and has a plurality of pulses. Each pulse of the data transmission control signal TP is used to indicate a write time when display data of a corresponding display line of the display panel 120 to be written into the display line. In this embodiment, a data charging time of one display line of the plurality of display lines may be determined by a time difference between a trailing edge (as a falling edge in FIG. 2) of a pulse of the data transmission control signal TP and a trailing edge of the pulse (i.e., enable period) of a gate driving signal, wherein the pulse of the gate driving signal is aligned with one of a plurality of pulses of the gate scanning control signals CLK1—CLK4.

By adjusting the data charge time, the timing controller 110 can make the display panel 120 operated under the variable refresh rate, and can maintain the consistency of a displayed brightness. It should be noted here, when the display refresh rate of the display panel 120 is changed from a higher first frequency to a lower second frequency, a vertical blanking time is increased and the displayed brightness is reduced. In response thereto, the timing controller 110 may adjust the gate scanning control signals CLK1~CLKN to generate a plurality of adjusted gate scanning control signals or adjust the data transmission control signal TP to generate an adjusted data transmission control signal, to increase the data charge time of the display panel 120. Such as that, the data charging time can be increased correspondingly, and the displayed brightness of the display panel 120 can be maintained.

Please refer to FIG. 1 and FIG. 2 commonly. A data enable signal DE can be transported to the timing control device 110 from a front-end circuit. The data enable signal DE is used to define a display time for one display line of the display panel 120. When the data enable signal DE is kept on a low voltage level, the display panel 120 is in a vertical blanking time period. When the display panel 120 operated in a first display refresh rate DFR1 is detected, the control circuit 111 can generate a plurality of gate scanning control signals CLK1~CLK4, a data transmission control signal TP and a transmission data TX_DATA (which represent display data for one driving channel). The data transmission control signal TP is used to define time points for accessing the transmission data TX_DATA. In this embodiment, the transmission data TX_DATA is transported to the display panel 120 at trailing edges of the pulses of the data transmission control signal TP.

In here, a plurality of pulses of the data transmission control signal TP are corresponding to a plurality of transmission data (denoted as TX_DATA) output from a driving channel. For example, the right-most data is regarding to data of the $1920^{th}$ display line, and a pulse of the data transmission control signal TP indicates a write time of the $1920^{th}$ display line; the second-right data is regarding to data of the $1919^{th}$ display line, and another pulse of the data transmission control signal TP indicates a write time of the $1919^{th}$ display line, and so on. In FIG. 2, a data charging time CT1 with respect to data of the $1917^{th}$ display line can be determined from a trailing edge of a pulse PS1, which is the pulse of the data transmission control signal TP indicating a write time of the $1917^{th}$ display line, to a trailing edge of the pulse (i.e., enable period) of the gate driving signal G1917, which is generated based on the gate scanning control signal CLK1 such that the pulse (i.e., enable period) of the gate driving signal G1917 is the same as the corresponding pulse of the gate scanning control signal CLK1.

When the display panel 120 changed to be operated in a second display refresh rate DFR2 is detected, and a second frequency of the second display refresh rate DFR2 is lower than a first frequency of the first display refresh rate DFR1, the control circuit 111 can delay phases of the gate scanning control signals CLK1~CLK4 to generate the plurality of adjusted gate scanning control signals CLK1'~CLK4', and data charging time of the display panel 120 can be increased.

Take the gate scanning control signal CLK1 as an example, the control circuit 111 can change a leading edge EG1 and a trailing edge EG2 of the gate scanning control signal CLK1 to respectively obtain an adjusted leading edge EG1' and an adjusted trailing edge EG2' of the adjusted gate scanning control signal CLK1'. By the adjusted trailing edge EG2' of the adjusted gate scanning control signal CLK1', an adjusted data charging time CT2, which is determined by a time difference between the trailing edge of the pulse (PS1) of the data transmission control signal TP indicating the write time of the $1917^{th}$ display line and an adjusted trailing edge of the pulse (i.e., enable period) of the gate driving signal G1917 which is aligned with the adjusted trailing edge EG2' of the adjusted gate scanning control signal CLK1', can be increased.

In present disclosure, a duty cycle and a frequency of the gate scanning control signal CLK1 may be as same as the adjusted gate scanning control signal CLK1'. Only the phase of each gate scanning control signal is changed.

In presented embodiment, if the display panel 120 changes to be operated in the first display refresh rate DFR1 from the second display refresh rate DFR2, i.e., the display refresh rate increases, the control circuit 111 can shift the phases of the gate scanning control signals CLK1'-CLK4' to be earlier to generate the adjusted gate scanning control signals CLK1-CLK4 to reduce the time difference between the trailing edge of the pulse (such as PS1, corresponding to the 1917$^{th}$ display line) of the data transmission control signal TP indicating the write time of the display line and the the adjusted trailing edge (such as EG2') of the adjusted gate scanning control signal (such as CLK1' which is aligned with the adjusted trailing edge of the gate driving signal G1917).

Such as that, a displayed brightness of the display panel 120 can be balanced between the first display refresh rate DFR1 and the second display refresh rate DFR2, whatever from a higher display refresh rate to a lower display refresh rate, or from a lower display refresh rate to a higher display refresh rate.

It should be noted here, a variation of the display refresh rate of the display panel 120 can be detected by the timing control device 110. When the display refresh rate is varied from the higher first display refresh rate DFR1 to the lower second display refresh rate DFR2, the timing control device 110 sets the control circuit 111 to generate the adjusted gate scanning control signals CLK1'~CLK4' by delaying the phases of the gate scanning control signals CLK1~CLK4.

Figure 3:
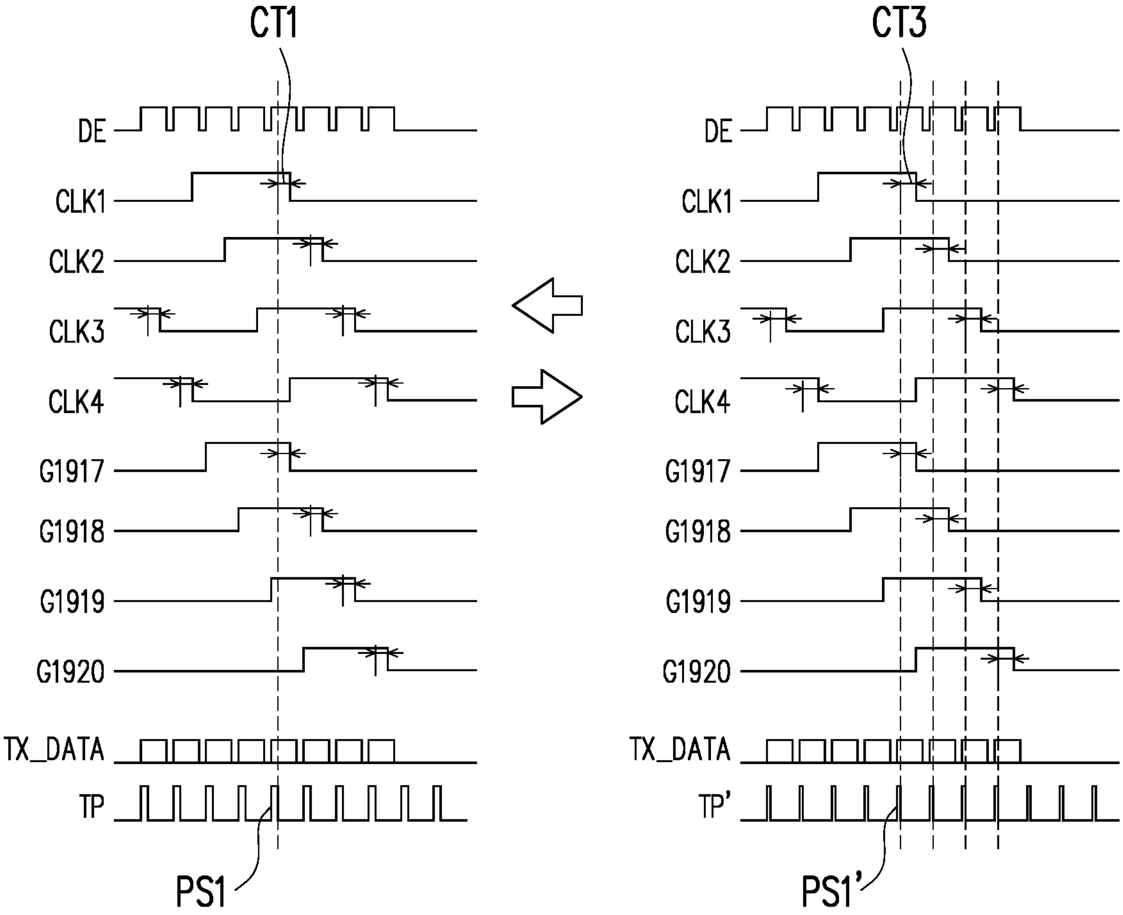
FIG. 3 illustrates waveform plots of a timing control device operated in different display refresh rates according to another embodiment of present disclosure.

Please refer to FIG. 1 and FIG. 3 commonly, wherein FIG. 3 illustrates waveform plots of a timing control device operated in different display refresh rates according to another embodiment of present disclosure. In FIG. 3, a data enable signal DE can be transported to the timing control device 110 from a front-end circuit. The data enable signal DE is used to define a display time for one display line of the display panel 120. When the data enable signal is kept on a low voltage level, the display panel 120 is in a vertical blanking time period. When the display panel 120 operated in a first display refresh rate DFR1 is detected, the control circuit 111 can generate a plurality of gate scanning control signals CLK1~CLK4, a data transmission control signal TP and a transmission data TX_DATA. The gate scanning control signals CLK1~CLK4 are sequentially enabled. The display panel 120 can generate a plurality of gate driving signals according to the gate scanning control signals CLK1~CLK4. The data transmission control signal TP is used to define time points for accessing the transmission data TX_DATA. In this embodiment, the transmission data TX_DATA is transported to the display panel 120 at trailing edges of the pulses of the data transmission control signal TP.

Take the gate scanning control signal CLK1 as an example, a data charging time CT1 of the 1917$^{th}$ display line can be determined by a time difference between a trailing edge of the pulse PS1 of the data transmission control signal TP with respect to the 1917$^{th}$ display line and a trailing edge of the pulse (i.e., enable period) of the gate driving signal G1917, which is aligned with the trailing edge of the gate scanning control signal CLK1.

When the display panel 120 operated in a second display refresh rate DFR2 is detected, and a second frequency of the second display refresh rate DFR2 is lower than a first frequency of the first display refresh rate DFR1, the control circuit 111 can reduce a duty cycle of the data transmission control signal TP to generate an adjusted data transmission control signal TP', such that the data charging time is increased.

In presented embodiment, the control circuit 111 can narrow a width of each pulse of the data transmission control signal TP, in other words, can reduce the duty cycle, to generate the adjusted data transmission control signal TP'. Take the gate scanning control signal CLK1 as an example, an adjusted data charging time CT3 of one display line can be determined by a time difference between a trailing edge of the narrowed pulse PS1' of the adjusted data transmission control signal TP' and the trailing edge of the pulse (i.e., enable period) of the gate driving signal G1917 which is aligned with the trailing edge of the gate scanning control signal CLK1.

Of course, if the display panel 120 changes to be operated in the first display refresh rate DFR1 from the second display refresh rate DFR2, the control circuit 111 can increase the duty cycle of the data transmission control signal TP' to generate the adjusted data transmission control signal TP. Such as that, a displayed brightness of the display panel 120 can be maintained in the variable refresh rate (VRR) application.

Figure 4:
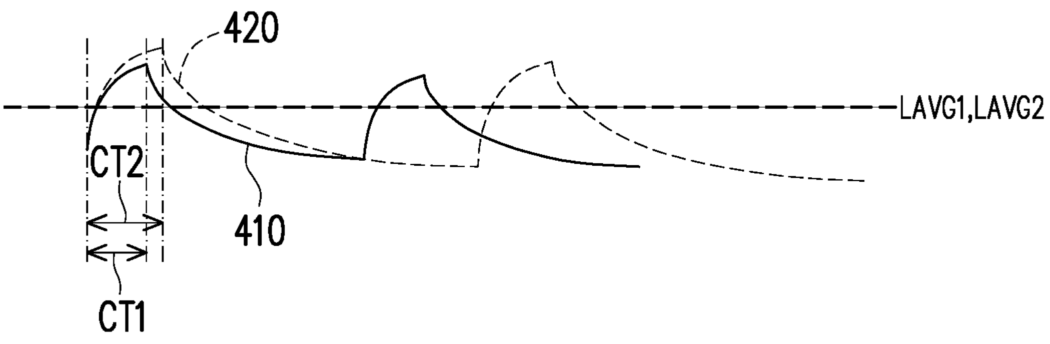
FIG. 4 illustrates a schematic plot for a displayed brightness compensation scheme according to an embodiment of present disclosure.

Please refer to FIG. 4, which illustrates a schematic plot for a displayed brightness compensation scheme according to an embodiment of present disclosure. A curve 410 is a displayed brightness when a display panel is operated in a first display refresh rate with a higher first frequency. A curve 420 is a displayed brightness when the display panel is operated in a second display refresh rate with a lower second frequency. In present embodiment, when a display refresh rate of the display panel is changed between the first display refresh rate and the second display refresh rate, the timing control device can dynamically adjust a data charging time between a data charging time CT1 and a data charging time CT2. In detail, when the display refresh rate of the display panel is the higher first frequency, the display panel may have the lower data charge time CT1, and when the display refresh rate of the display panel is the lower first frequency, the display panel may have the higher data charge time CT2. Such as that, an average displayed lightness LAVG1 of the display panel in the first display refresh rate can be as same as an average displayed lightness LAVG2 of the display panel in the second display refresh rate. A display performance of the display panel can be improved.

Figure 5:
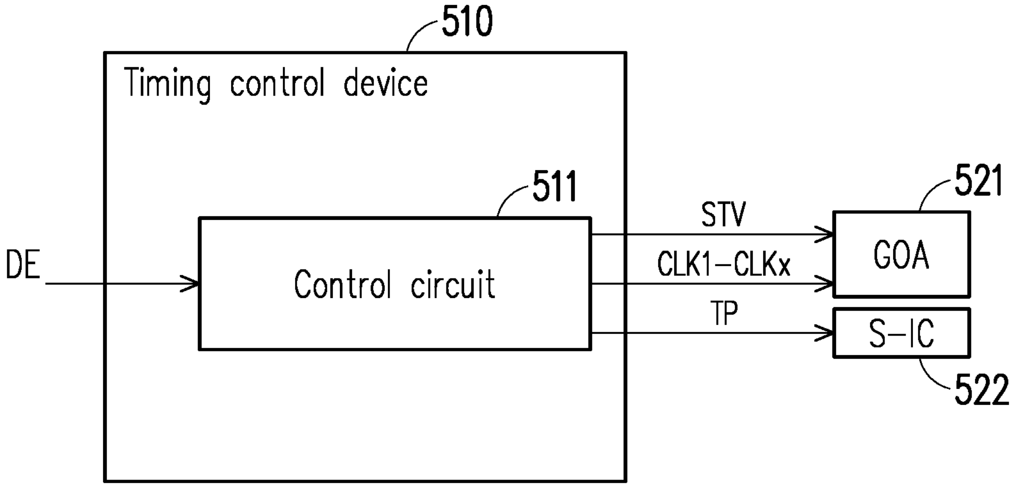
FIG. 5 illustrates a block diagram of a timing control device according to another embodiment of preset disclosure.

Please refer to FIG. 5, which illustrates a block diagram of a timing control device according to another embodiment of preset disclosure. The timing control device 510 is coupled to a gate on array (GOA) 521 and a source driver (S-IC) 522. The GOA 521 and the S-IC 522 are used to respectively provide gate driving signals and source driving signals to drive a display panel. The timing control device 510 includes a control circuit 511. The timing control device 510 receives a data enable signal DE and generates a frame start signal STV, a plurality of gate scanning control signals CLKX and a data transmission control signal TP. The timing control device 510 transports the frame start signal STV and the gate scanning control signals CLKX to the GOA 521, and transports the data transmission control signal TP to the S-IC 522. The GOA 521 can generate the gate driving signals according to the frame start signal STV and the gate scanning control signals CLKX. The S-IC 522 can generate the source driving signals according to the data transmission control signal TP and transmission data.

In present embodiment, the GOA 521 can be implemented by any gate on array circuit well known by a person skilled in this art, the S-IC 522 also can be implemented by any source driving circuit well known by a person skilled in this art, and there are no more special limitations here.

In this embodiment, the data enable signal DE can be provided by a front-end circuit, such as a television chip. The control circuit 511 can detect a display refresh rate according to the data enable signal DE. In detail, the data enable signal DE can provide a certain time period for keeping on a low voltage level, and the certain time period is a vertical blanking time period. The control circuit 511 can detect the display refresh rate by identifying the vertical blanking time period according to the data enable signal DE. If a time length of the vertical blanking time period getting longer, the control circuit 511 can determine the display refresh rate is reduced, and if the time length of the vertical blanking time period getting shorter, the control circuit 511 can determine the display refresh rate is increased.

Furthermore, the control circuit 511 can generate the frame start signal STV according to the data enable signal DE. The control circuit 511 also can obtain the display refresh rate according to the frame start signal STV. Wherein, the frame start signal STV provides a plurality of vertical start pulses, and the control circuit 511 can obtain the display refresh rate by calculating two neighbored start pulses.

The control circuit 511 can adjust phases of the gate scanning control signals CLK1-CLKx or adjust a duty cycle of the data transmission control signal TP according to the detected display refresh rate known by detecting the frame start signal STV. If the display refresh rate is varied from a higher first frequency to a lower second frequency, the control circuit 511 can delay the phases of the gate scanning control signals CLK1-CLKx, or reduce the duty cycle of the data transmission control signal TP. On the contrary, if the display refresh rate is varied from the lower first frequency to the higher second frequency, the control circuit 511 can shift the phases of the gate scanning control signals CLK1-CLKx to be earlier, or increase the duty cycle of the data transmission control signal TP.

A hardware structure of the control circuit 511 can be implement by digital circuit. Or the control circuit 511 can be implemented by any processor or controller chip having operation capability and well known by a person skilled in this art.

Figure 6:
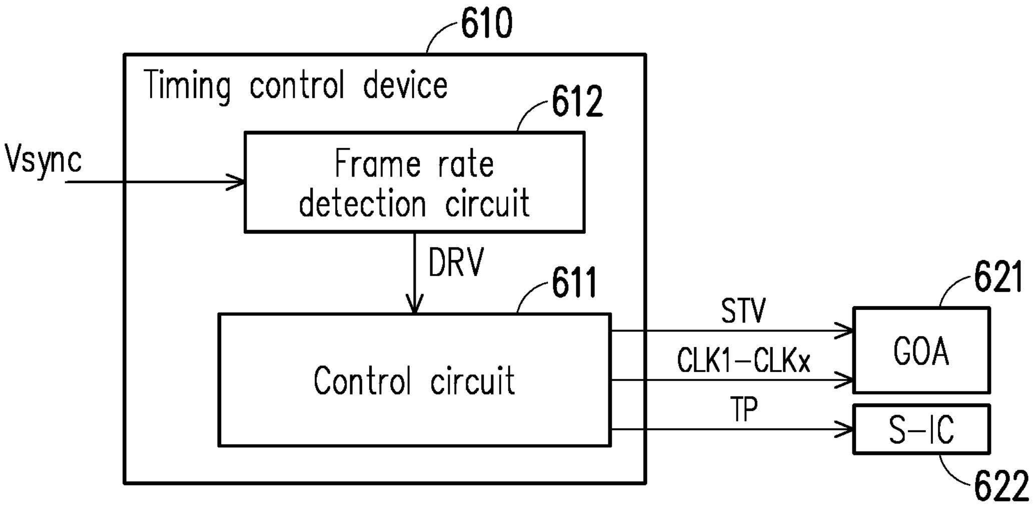
FIG. 6 illustrates a block diagram of a timing control device according to another embodiment of preset disclosure.

Please refer to FIG. 6, which illustrates a block diagram of a timing control device according to another embodiment of preset disclosure. The timing control device 610 is coupled to a gate on array (GOA) 621 and a source driver (S-IC) 622. The GOA 621 and the S-IC 622 are used to respectively provide gate driving signals and source driving signals to drive a display panel. The timing control device 610 includes a control circuit 611 and a frame rate detection circuit 612. The control circuit 611 is coupled to the frame rate detection circuit 612. The frame rate detection circuit 612 may receive a vertical synchronization signal Vsync, and determine a display refresh rate according to the vertical synchronization signal Vsync. The frame rate detection circuit 612 may generate a digital value DRV according to the detected display refresh rate, and transport the digital value DRV to the control circuit 611.

The control circuit 611 receives the digital value DRV and obtain the display refresh rate by decoding the digital value DRV. The control circuit 511 can adjust phases of the gate scanning control signalsCLK1-CLKx or adjusts a duty cycle of the data transmission control signal TP according to the detected display refresh rate. If the display refresh rate is varied from a higher first frequency to a lower second frequency, the control circuit 611 can delay the phases of the gate scanning control signals CLK1-CLKx, or reduce the duty cycle of the data transmission control signal TP. On the contrary, if the display refresh rate is varied from the lower first frequency to the higher second frequency, the control circuit 611 can shift the phases of the gate scanning control signals CLK1-CLKx to be earlier, or increase the duty cycle of the data transmission control signal TP.

Figure 7:
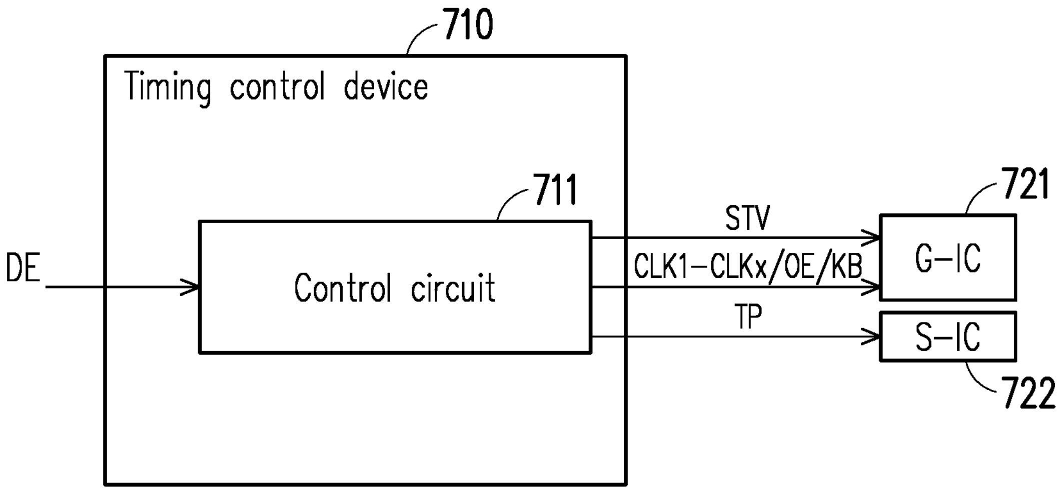
FIG. 7 illustrates a block diagram of a timing control device according to another embodiment of preset disclosure.

Please refer to FIG. 7, which illustrates a block diagram of a timing control device according to another embodiment of preset disclosure. The timing control device 710 is coupled to a gate driver (G-IC) 721 and a source driver (S-IC) 722. Different from the timing control device 510 in FIG. 5, the timing control device 710 is coupled to the G-IC 721 which is not disposed on the display panel. Both of the G-IC 721 and the S-IC 722 may be off-panel chips.

In this embodiment, the timing control device 710 includes a control circuit 711. The control circuit 711 receives a data enable signal DE and generates a frame start signal STV, a plurality of gate scanning control signal CLK1-CLKx, an output enable signal OE, a shading signal KB and a data transmission signal TP according to the data enable signal DE. The control circuit 711 transports the frame start signal STV, the gate scanning control signal CLK1-CLKx, the output enable signal OE and the shading signal KB to the G-IC 721 and transports the data transmission signal TP to the S-IC 722.

The control circuit 711 can obtain a display refresh rate according to the data enable signal DE. The control circuit 711 can further adjust phases of the gate scanning control signals CLK1-CLKx according to the detected display refresh rate.

In present embodiment, the G-IC 721 can be implemented on an integrated circuit, and a hardware structure of the G-IC 721 can be implemented by any gate driving circuit well known by a person skilled in the art. The S-IC 722 also can be implemented by any source driving circuit well known by a person skilled in the art. There are no special limitations here.

Figure 8:
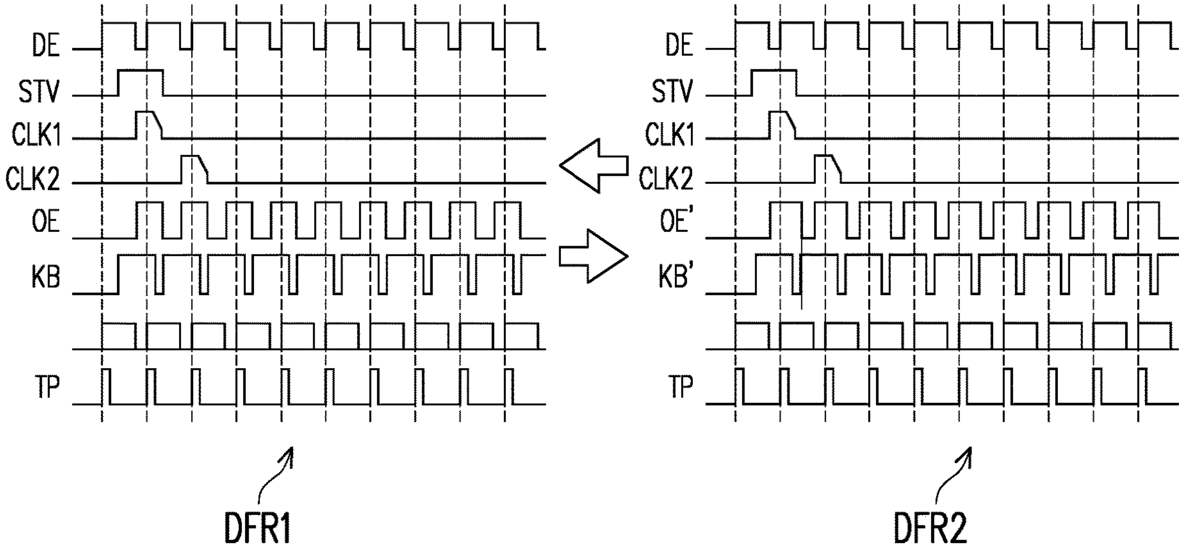
FIG. 8 illustrates waveform plots of a timing control device operated in different display refresh rates according to another embodiment of present disclosure.

FIG. 8 illustrates waveform plots of a timing control device operated in different display refresh rates according to another embodiment of present disclosure. Refer to FIG. 7 and FIG. 8, in this embodiment, for adjusting the phases of the gate scanning control signals CLK1-CLKx, the control circuit 711 can adjust the gate scanning control signals CLK1-CLKx by adjusting a duty cycle of the output enable signal OE and adjusting a phase of the shading control signal KB. In detail, please refer to FIG. 8, which illustrates waveform plots of a timing control device operated in different display refresh rates according to another embodiment of present disclosure. When the display refresh rate is getting lower (the display refresh rate is varied from a first display refresh rate DFR1 to a second display refresh rate DFR2), the control circuit 711 may delay a trailing edge of each of the gate scanning control signals CLK1-CLKx by increasing the duty cycle of the output enable signal DE and delaying the phase of a shading control signal KB. A data charging time for a display line can be increased. On the contrary, when the display refresh rate is getting higher (the display refresh rate is varied from the second display refresh rate DFR2 to the first display refresh rate DFR1), the control circuit 711 may shift the trailing edge of each of the gate scanning control signals CLK1-CLKx to be earlier by reducing the duty cycle of the output enable signal DE and shifting the phase of a shading control signal KB to be earlier. The data charging time for a display line can be reduced.

Figure 9:
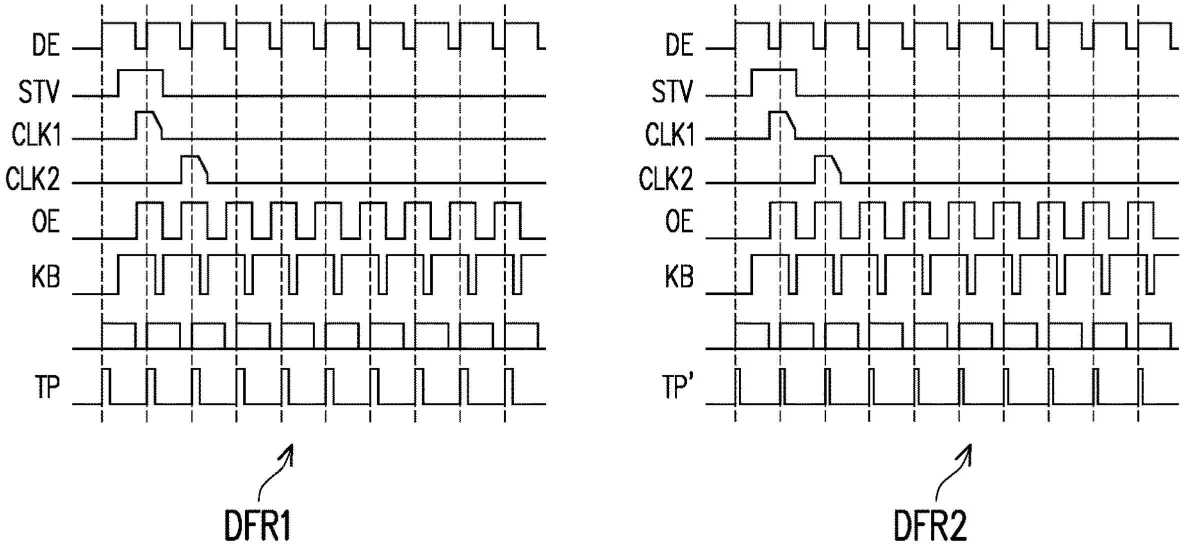
FIG. 9 illustrates waveform plots of a timing control device operated in different display refresh rates according to another embodiment of present disclosure.

On the other way, in another embodiment, in response to the variation of the display refresh rate, the control circuit 711 can adjusting the duty cycle of the data transmission control signal TP according to the detected display refresh rate. Please refer to FIG. 9, which illustrates waveform plots of a timing control device operated in different display refresh rates according to another embodiment of present disclosure. When the display refresh rate is getting lower (the display refresh rate is varied from a first display refresh rate DFR1 to a second display refresh rate DFR2), the control circuit 711 can reduce the duty cycle of the data transmission control signal TP based on not to change the frequency of the data transmission control signal TP, to increase the data charging time for a display line. In other words, the control circuit 711 narrows a width of each pulse of the data transmission control signal TP to increase a data charging time for a display line. On the contrary, when the display refresh rate is getting higher (the display refresh rate is varied from the second display refresh rate DFR2 to the first display refresh rate DFR1), the control circuit 711 can increase the duty cycle of the data transmission control signal TP based on not to change the frequency of the data transmission control signal TP, to reduce the data charging time for a display line. In other words, the control circuit 711 enlarges a width of each pulse of the data transmission control signal TP to reduce the data charging time for a display line.

Such as that, by adjusting the plurality of gate scanning control signals or adjusting the data transmission control signal, the control circuit 711 can adjust the data charging time for a display line according to the display refresh rate, and a displayed brightness of the display panel can be maintained.

Figure 10:
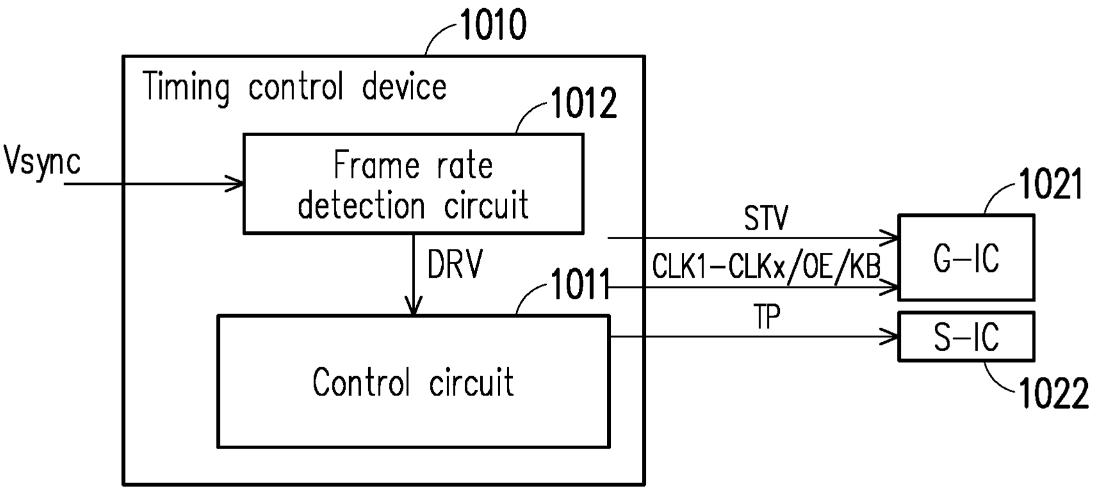
FIG. 10 illustrates a block diagram of a timing control device according to another embodiment of preset disclosure.

Please refer to FIG. 10, which illustrates a block diagram of a timing control device according to another embodiment of preset disclosure. The timing control device 1010 is coupled to a gate driver (G-IC) 1021 and a source driver (S-IC) 1022. The timing control device 1010 is coupled to the G-IC 1021 which is not disposed on the display panel. Both of the G-IC 1021 and the S-IC 1022 may be off-panel chips. The timing control device 1010 includes a control circuit 1011 and a frame rate detection circuit 1012. The control circuit 1011 is coupled to the frame rate detection circuit 1012. The frame rate detection circuit 1012 receives a vertical synchronization signal Vsync, and determine a display refresh rate according to the vertical synchronization signal Vsync. The frame rate detection circuit 1012 can generate a digital value DRV according to the detected display refresh rate, and transport the digital value DRV to the control circuit 1011.

The control circuit 1011 can decode the digital value DRV to obtain display refresh rate, and generates a frame start signal STV, a plurality of gate scanning control signal CLK1-CLKx, an output enable signal OE, a shading signal KB and a data transmission signal TP according to the display refresh rate. In this embodiment, the control circuit 1011 can further adjust phases of the gate scanning control signals CLK1-CLKx according to the detected display refresh rate, or adjust the data transmission control signal TP, for driving a display panel under the currently detected display refresh rate.

Figure 11:
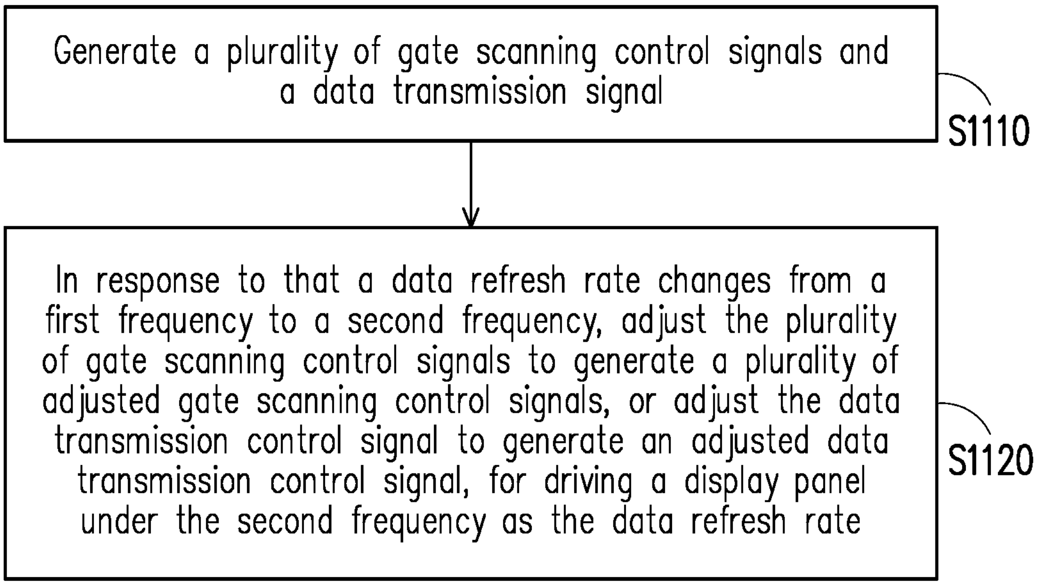
FIG. 11 illustrates a flow chart of a control method for a display device according to an embodiment of present disclosure.

Please refer to FIG. 11, which illustrates a flow chart of a control method for a display device according to an embodiment of present disclosure. In a step S1110, a plurality of gate scanning control signals and a data transmission signal are generated. In a step S1120, in response to that a display refresh rate changes from a first frequency to a second frequency, the plurality of gate scanning control signals can be adjusted to generate a plurality of adjusted gate scanning control signals, or the data transmission control signal can be adjusted to generate an adjusted data transmission control signal, for driving a display panel under the second frequency as the display refresh rate.

Detail of the steps mentioned above have been described in the above embodiments, and no more repeated description here.

In summary, in preset embodiments, in response to the variable display refresh rate, the timing control device can adjust the gate scanning control signals or adjust the data transmission control signal to adjust data charging time for each display line of the display panel. Such as that, a displayed brightness of the display panel can be maintained in the variable refresh rate application, and a performance of the display panel can be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A timing control device for a display panel, comprising:

a control circuit, configured to generate a plurality of gate scanning control signals and a data transmission control signal, wherein the gate scanning control signals are sequentially enabled for driving the display panel, and the gate scanning control signals have a same period and different phases;

wherein, in response to that a display refresh rate changes from a higher first frequency to a lower second frequency, the control circuit delays phases of the plurality of gate scanning control signals to generate a plurality of adjusted gate scanning control signals or, in response to that the display refresh rate changes from a lower first frequency to a higher second frequency, the control circuit shifts the phases of the plurality of gate scanning control signals to be earlier to generate the plurality of adjusted gate scanning control signals, for driving a display panel under the second frequency as the display refresh rate.

2. The timing control device as claimed in claim 1, wherein the control circuit delays or shifts the phases of the plurality of gate scanning control signals by changing a leading edge of each of the plurality of gate scanning control signals and changing a trailing edge or changing a pulse width of each of the plurality of gate scanning control signals.

3. The timing control device as claimed in claim 1, wherein the control circuit is further configured to receive a data enable signal and determine the display refresh rate according to the data enable signal.

4. The timing control device as claimed in claim 1, further comprising:

a frame rate detection circuit, coupled to the timing control circuit, configured to receive a vertical synchronization signal and determine the display refresh rate according to the vertical synchronization signal.

5. The timing control device as claimed in claim 1, wherein the timing control device transports the gate scanning control signals to a gate driving circuit, and transports the data transmission signal to a source driving circuit.

6. A control method for a display device, comprising:

generating a plurality of gate scanning control signals and a data transmission signal, wherein the gate scanning control signals are sequentially enabled for driving a display panel, and the gate scanning control signals have a same period and different phases; and in response to that a display refresh rate changes from a higher first frequency to a lower second frequency, delaying phases of the plurality of gate scanning control signals to generate a plurality of adjusted gate scanning control signals, or, in response to that the display refresh rate changes from a lower first frequency to a higher second frequency, shifting the phases of the plurality of gate scanning control signals to be earlier to generate the plurality of adjusted gate scanning control signals, for driving the display panel under the second frequency as the display refresh rate.

7. The control method as claimed in claim 6, wherein a step of delaying the phases of the plurality of gate scanning control signals or shifting the phases of the plurality of gate scanning control signals to be earlier comprises:

changing a leading edge of each of the plurality of gate scanning control signals and changing a trailing edge or a pulse width of each of the plurality of gate scanning control signals.

8. The control method as claimed in claim 6, further comprising:

receiving a data enable signal and determining the display refresh rate according to the data enable signal.

9. The control method as claimed in claim 6, further comprising:

receiving a vertical synchronization signal and determining the display refresh rate according to the vertical synchronization signal.

10. A timing control device for a display panel, comprising:

a control circuit, configured to generate a plurality of gate scanning control signals and a data transmission control signal, wherein the gate scanning control signals are sequentially enabled for driving the display panel, and the gate scanning control signals have a same period and different phases;

wherein in response to that the display refresh rate changes from a higher first frequency to a lower second frequency, the control circuit reduces the duty cycle of the data transmission control signal to generate the adjusted data transmission control signal;

or, in response to that the display refresh rate changes from a lower first frequency to a higher second frequency, the control circuit increases the duty cycle of the data transmission control signal to generate the adjusted data transmission control signal, wherein the control circuit reduces or increases the duty cycle of the data transmission control signal by changing a trailing edge of the data transmission control signal or changing a pulse width of the data transmission control signal.

11. The timing control device as claimed in claim 10, wherein the control circuit is further configured to receive a data enable signal and determine the display refresh rate according to the data enable signal.

12. The timing control device as claimed in claim 10, wherein the control circuit is further configured to receive a data enable signal and determine the display refresh rate according to the data enable signal, or, the timing control device further comprises a frame rate detection circuit, which is coupled to the timing control circuit and configured to receive a vertical synchronization signal and determine the display refresh rate according to the vertical synchronization signal.

13. A control method for a display device, comprising:

generating a plurality of gate scanning control signals and a data transmission control signal, wherein the gate scanning control signals are sequentially enabled for driving a display panel, and the gate scanning control signals have a same period and different phases;

in response to that the display refresh rate changes from a higher first frequency to a lower second frequency, reducing the duty cycle of the data transmission control signal to generate the adjusted data transmission control signal; or, in response to that the display refresh rate changes from a lower first frequency to a higher second frequency, increasing the duty cycle of the data transmission control signal to generate the adjusted data transmission control signal, wherein the duty cycle of the data transmission control signal is reduced or increased by changing a trailing edge of the data transmission control signal or changing a pulse width of the data transmission control signal.

14. The control method of claim 13, further comprising:

receiving a data enable signal and determining the display refresh rate according to the data enable signal.

15. The control method of claim 13, further comprising:

receiving a data enable signal and determining the display refresh rate according to the data enable signal, or, receiving a vertical synchronization signal and determining the display refresh rate according to the vertical synchronization signal.

16. A timing control device for a display panel, comprising:

a control circuit, configured to generate a plurality of gate scanning control signals, wherein the gate scanning control signals are sequentially enabled for driving the display panel, and the gate scanning control signals have a same period and different phases;

wherein, in response to that a display refresh rate changes from a first frequency to a second frequency, the control circuit adjusts the plurality of gate scanning control signals to generate a plurality of adjusted gate scanning control signals by adjusting a duty cycle of an output enable signal and adjusting a phase of a shading control signal, for driving a display panel under the second frequency as the display refresh rate.

17. The tuning control device as claimed in claim 16, wherein the control circuit delays a trailing edge of each of the gate scanning control signals by increasing the duty cycle of the output enable signal and delaying the phase of a shading control signal, or the control circuit shifts the trailing edge of each of the gate scanning control signals to be earlier by decreasing the duty cycle of the output enable signal and shifting the phase of a shading control signal to be earlier.

18. The timing control device as claimed in claim 16, wherein the control circuit is further configured to receive a data enable signal and determine the display refresh rate according to the data enable signal, or, the timing control device further comprises a frame rate detection circuit, which is coupled to the timing control circuit and configured to receive a vertical synchronization signal and determine the display refresh rate according to the vertical synchronization signal.

* * * * *